United States Patent [19]

Bondhus et al.

[11] Patent Number: 4,781,073
[45] Date of Patent: Nov. 1, 1988

[54] ADJUSTABLE ANTIBACKLASH GEAR SYSTEM

[75] Inventors: Bradley J. Bondhus, Laurel; Wayne B. Lloyd, Catonsville, both of Md.

[73] Assignee: The United States of America as represented by the Secretary of the Army, Washington, D.C.

[21] Appl. No.: 70,840

[22] Filed: Jun. 24, 1987

[51] Int. Cl.⁴ .................. F16H 55/24; F16H 55/18
[52] U.S. Cl. ........................................ 74/440; 74/409
[58] Field of Search ..................... 74/440, 441, 409

[56] References Cited

U.S. PATENT DOCUMENTS

| | | | |
|---|---|---|---|
| 1,604,105 | 10/1926 | Starkey | 74/440 |
| 1,681,612 | 8/1928 | Harrold | 74/440 |
| 1,854,608 | 4/1932 | Burger | 74/440 |
| 2,911,847 | 11/1959 | Huck | 74/440 |
| 3,407,727 | 10/1968 | Fischer | 74/440 |

FOREIGN PATENT DOCUMENTS

| | | | |
|---|---|---|---|
| 291063 | 9/1971 | U.S.S.R. | 74/409 |
| 777291 | 11/1980 | U.S.S.R. | 74/440 |
| 823717 | 4/1981 | U.S.S.R. | 74/440 |
| 1002708 | 3/1983 | U.S.S.R. | 74/409 |

OTHER PUBLICATIONS

L. Kasper, "4 Ways to Eliminate Backlash", Product Engineering, Apr. 29, 1963.

Primary Examiner—Lawrence Staab
Attorney, Agent, or Firm—Freddie M. Bush; Robert L. Broad, Jr.

[57] ABSTRACT

An antibacklash gear system wherein a pair of gears mounted for limited movement therebetween are biased by a spring to move the teeth of the gears out of register, the spring serving as a link between two levers mounted on one of the gears. The position of one of the levers may be adjusted to vary the force applied to the other lever by the spring to thereby vary the force urging the gears to move relative to each other.

4 Claims, 1 Drawing Sheet

ADJUSTABLE ANTIBACKLASH GEAR SYSTEM

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION a. Field of the Invention. This invention relates to apparatus for eliminating backlash in a gear system.

b. Prior art. Backlash occurs in a gear system because of necessary fabrication tolerances and is a function of the distance between the centers of two meshed gears. Some backlash is needed for clearance to accommodate lubricants, dirt and thermal expansion. Backlash in a gear system allows some lost motion when the driving gear slows or is reversed. In most applications, this lost motion does not present a problem. In some systems, however, such as in servo-controlled systems, gear backlash will result in instability of the driving system. The reason for this is that the driven gear is free to move without resistance through the backlash.

Antibacklash gears are known. Typically, an antibacklash gear is made up of two gears mounted adjacent to each other, with one of the gears being secured to a drive or driven shaft and the other being mounted for a limited movement on the first gear. A spring interconnects the two gears to urge the teeth of one gear out of register with the teeth of the other gear in such a manner that the out-of-register teeth of the two gears completely fill the space between two adjacent teeth on the gear with which the antibacklash gears are meshed. Generally, it has been the practice to so heavily preload the gears making up the antibacklash gear that the driving and driven teeth on the pair of meshed gears are never unseated. This heavy preload has the disadvantage that it will cause excessive tooth wear when heavy torque loads are transmitted.

SUMMARY OF THE INVENTION

An antibacklash gear system made up of a pair of adjacent gears secured together for limited movement therebetween and a pair of levers pivotally mounted on one of the gears, the levers being connected by a spring. An adjustment screw mounted on the one gear pivots one of the levers to vary the force supplied to other lever by the spring, the other lever moving under the influence of this force to engage a projection on the other gear and urge the teeth of the two gears out of register.

DESCRIPTION OF THE PREFERRED EMBODIMENT

Figure 1:
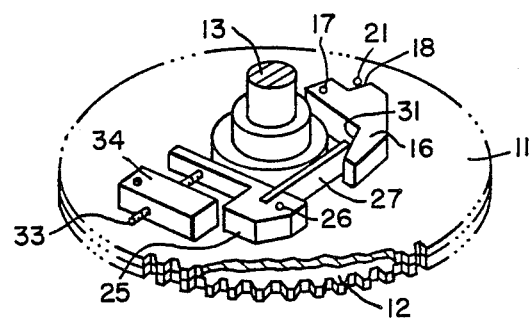
FIG. 1 is a perspective view showing the various elements which make up the invention disclosed and claimed herein.
Figure 2:
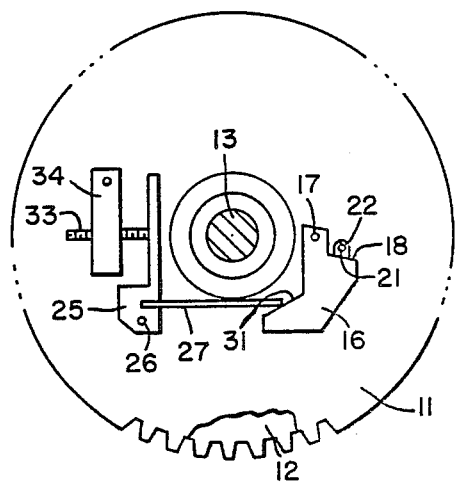
FIG. 2 is a plan view of the apparatus of FIG. 1 showing the configurations of the various elements of the invention.

Referring now in detail to FIGS. 1 and 2 of the drawing, there is shown a pair of gears 11 and 12 positioned adjacent to each other on a shaft 13, with the gear 11 being keyed to the shaft 13 (key not shown) and the gear 12 being mounted to turn freely on the shaft 13. A first lever 16 pivotally mounted on a pin 17 attached to the gear 11 is provided with a surface 18 (FIG. 2) which is positioned to engage and move a pin 21 secured to the gear 12 and extending through an opening 22 (FIG. 2) in the gear 11. It can be seen that movement of the lever 16 will move the pin 21 to move the teeth of the gears 11 and 12 out of register.

A second lever 25 pivotally mounted on a pin 26 secured to the gear 11 has attached thereto a leaf spring 27 which engages a surface 31 (FIG. 2) on the lever 16. The force supplied to the surface 31 by the leaf spring 27 urges the lever 16 in a direction to move the pin 21 and the gear 12 relative to the gear 11 to thereby move the teeth on the gears 11 and 12 out of register. By moving the teeth on the gears 11 and 12 out of register, backlash between the pair of gears 11 and 12 and the driven or driving gear (not shown) will be eliminated.

A set screw 33 threaded through a block 34 secured to the gear 11 engages the lever 25. It can readily be seen that the force supplied to the lever 16 by the leaf spring 27 can be adjusted by turning the set screw 33.

Figure 3:
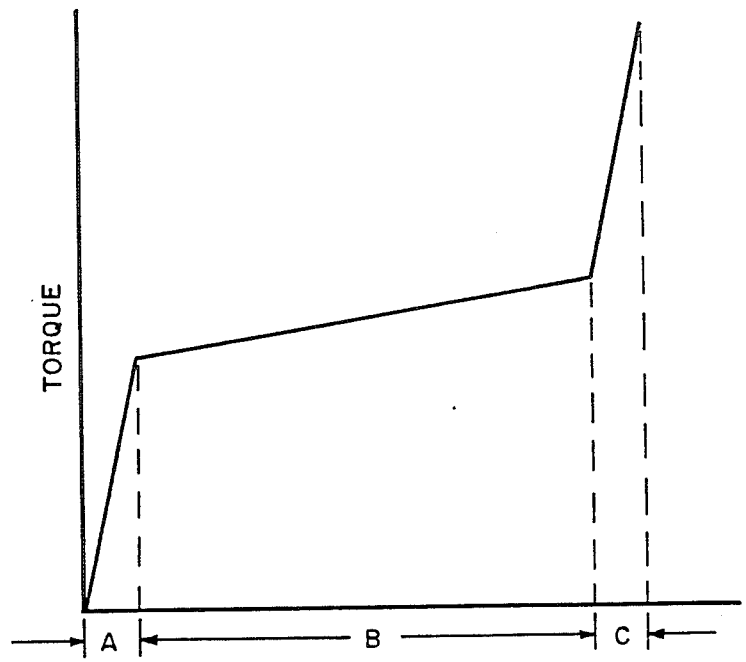
FIG. 3 is a graph illustrating the relationship between transmitted torque and gear teeth contact in the antibacklash system of this invention.

FIG. 3 illustrates the relationship between torque and the relative positioning of the antibacklash gears 11 and 12. Assume that a driving gear (not shown) is meshed with the gears 11 and 12 to drive these gears in a clockwise direction (FIG. 1). At low torques, represented by the letter A in FIG. 3, the teeth on the gears 11 and 12 are as far out of register as the spacing between adjacent teeth on the drive gear will allow. In this mode, the torque applied by the drive gear to the gear 12 acts through the spring 27 to drive the gear 11. When the torque being transmitted from the drive gear (not shown) is increased beyond a certain value, the spring 27 begins to flex and the gear 12 begins to move clockwise relative to the gear 11. This is represented by zone B in FIG. 3. In an ordinary gear system this is where backlash would occur. In this gear system the gears 11 and 12 are positively driven in this zone.

As the torque being transmitted by the drive gear (not shown) is increased still more, the spring 27 will be flexed sufficiently, and the gear 12 moved sufficiently with respect to the gear 11, that the teeth of the gears 11 and 12 are in register and the torque is being transmitted directly from the drive gear (not shown) to the gear 11. This is represented by zone C in FIG. 3.

It can readily be seen that, at all torque values, the driven gear 11 is positively connected to the drive gear (not shown) to provide a stable drive at all torque levels.

The use of the set screw 33 allows for a very precise adjustment of the loading provided by the spring 27. By turning the set screw 33, that portion of the torque curve represented by zone B in FIG. 3 can be raised or lowered.

We claim:

1. An antibacklash gear system, comprising:
   a. a first gear having an aperture therein,
   b. a second gear coaxial with the first gear, said second gear being mounted on the first gear for movement relative to the first gear about the axis of the gears, c. a pin secured to the second gear and extending through the aperture in the first gear, d. a first lever pivotally mounted on the first gear and having a surface positioned to engage the pin and move the second gear relative to the first gear, e. a second lever pivotally mounted on the first gear, f. a leaf spring secured to the second lever, said spring being positioned to engage the first lever to urge said surface against said pin, and g. an adjustment screw mounted on the first gear for engaging the second lever to adjust the force applied to the first lever by the leaf spring.

2. An antibacklash gear system, comprising:

a. a first gear having a first side and a second side, b. a second gear coaxial with and adjacent to said second side of said first gear, said second gear being connected to said first gear for limited movement relative to said first gear, aid second gear having a projection thereon extending beyond said first side of said first gear, c. a first layer pivotally mounted on said first side of said first gear, d. resilient means attached to said first side of said first gear for urging said first lever against said projection whereby said second gear moves relative to said first gear, and e. means for adjusting force applied to said first lever by said resilient means.

3. An antibacklash gear system as recited in claim 2 wherein said resilient means is a leaf spring.

4. An antibacklash gear system as recited in claim 2 wherein said adjusting means comprises:

a. a second lever pivotally mounted on said first side of said first gear, said second lever being connected to said resilient means, and b. a screw mounted on said first side of said first gear, an end of said screw engaging said second lever to adjust the position of said second lever to thereby change tension on said resilient means.

* * * * *